United States Patent [19]

Johnson et al.

[11] 4,448,607

[45] May 15, 1984

[54] CONDITIONING CRUDE PHTHALOCYANINE PIGMENTS

[75] Inventors: Steven L. Johnson, Fairfield; George McLaren, Mason; George H. Robertson, Montgomery, all of Ohio

[73] Assignee: Sun Chemical Corporation, New York, N.Y.

[21] Appl. No.: 420,083

[22] Filed: Sep. 20, 1982

[51] Int. Cl.$^3$ .............. C09D 11/00; C08L 1/08; C09B 47/04

[52] U.S. Cl. .............. 106/19; 106/20; 106/171; 106/288 Q; 260/245.73; 260/245.77; 260/245.87

[58] Field of Search .............. 106/288 Q, 19, 171, 106/20; 260/245.73, 245.77, 245.87

[56] References Cited

U.S. PATENT DOCUMENTS

| | | | |
|---|---|---|---|
| 2,761,868 | 9/1956 | Lacey | 260/245.73 |
| 2,855,403 | 10/1958 | McKellin et al. | 106/288 Q |
| 2,891,964 | 6/1959 | Roberts | 106/288 Q |
| 3,589,924 | 6/1971 | Giambalvo | 106/288 Q |
| 4,141,904 | 2/1979 | Cabut et al. | 106/288 Q |
| 4,221,606 | 9/1980 | Funatsu | 106/288 Q |
| 4,371,643 | 2/1983 | Thomas | 106/288 Q |

OTHER PUBLICATIONS

Offenlegungsschrift 2811539 Sep. 21, 1978, Wheeler et al., 24 pp.

*Primary Examiner*—Theodore Morris
*Attorney, Agent, or Firm*—Cynthia Berlow

[57] ABSTRACT

Crude phthalocyanine is converted from its crude state to its pigmentary form by (1) milling it with a phthalimidomethyl phthalocyanine derivative or a sulfonated phthalimidomethyl phthalocyanine derivative in the absence of any milling or grinding aid or by (2) grinding the crude phthalocyanine in the absence of any milling or grinding aid and then blending the ground material with a phthalimidomethyl phthalocyanine derivative or a sulfonated phthalimidomethyl phthalocyanine derivative. Without any additional conditioning or purification the pigment product is suitable for use in printing inks, paints, coating compositions, and the like.

8 Claims, No Drawings

CONDITIONING CRUDE PHTHALOCYANINE PIGMENTS

BACKGROUND OF THE INVENTION

This invention relates to pigments. More particularly it relates to the converting of crude phthalocyanine pigments to pigmentary form. As used herein, the term "crude pigment" defines a colorant that has a much larger particle size than does its pigment grade; for example, the particle size of the crude grade of phthalocyanine is generally about 40 to 50 microns or larger, whereas the particle size of its pigmentary grade is generally about 0.01 to 1 micron.

There are many known methods for conditioning crude pigments, such as dry grinding the crude phthalocyanine in the presence of a grinding aid, such as an alkali metal halide, carbonate, sulfate, or phosphate; sugar; urea; calcium oxide; or the like. Other methods include grinding the crude phthalocyanine in the absence of a grinding aid, then admixing it with an organic solvent; admixing the finely-divided crude material with sulfuric acid and a copper phthalocyanine derivative; admixing the finely-divided crude material with an organic or aqueous organic medium and a copper phthalocyanine derivative; or admixing the finely-divided crude phthalocyanine with an aqueous medium containing a surfactant. Another method of conditioning a crude phthalocyanine is to grind it in the presence of a solvent and a sulfonated phthalocyanine amine derivative.

SUMMARY OF THE INVENTION

Crude phthalocyanine is converted into pigmentary grade by (1) milling it with a phthalimidomethyl phthalocyanine derivative or a sulfonated phthalimidomethyl phthalocyanine derivative in the absence of any milling or grinding aid or (2) grinding the crude phthalocyanine in the absence of any milling or grinding aid and then mixing it with the phthalocyanine derivative. The pigmentary grade product is particularly suitable for use in publication gravure ink systems.

DETAILED DESCRIPTION OF THE INVENTION

Crude phthalocyanine is converted from its crude state to its pigmentary form by (1) milling it with a phthalimidomethyl phthalocyanine derivative or with a sulfonated phthalimidomethyl phthalocyanine derivative in the absence of any grinding or conditioning aid or (2) grinding the crude phthalocyanine in the absence of any milling or grinding aid and then mixing it with the phthalocyanine derivative.

The derivatives have the general formulas

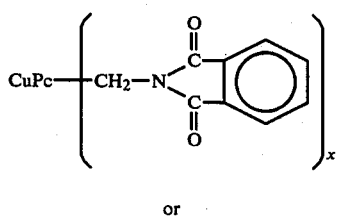

or

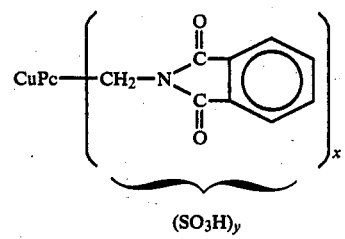

where Pc is a phthalocyanine radical, x is 0.6 to 2.1, y is 0.2 to 2.5, and x+y is not greater than 3. The phthalimidomethyl phthalocyanine derivative of this invention is disclosed in U.S. Pat. No. 2,855,403 and the sulfonated derivative is disclosed in U.S. Pat. No. 3,589,824. Both of these patents are incorporated herein by reference.

In a preferred embodiment of this invention crude copper phthalocyanine (beta-crystal form) is milled with the selected derivative in the absence of any grinding aid or conditioning agent. In general the derivative is used in an amount of about 3 to 20 percent, and preferably about 5 to 15 percent, based on the weight of the product.

The ingredients are milled for about 3 to 100 hours, and preferably about 15 to 30 hours, in conventional milling apparatus, such as for example a ball mill or a vibratory mill. The milling temperature is generally within the range of about 20° to 130° C.; preferably it is between about 45° to 100° C. The ingredients may be blended prior to grinding or in the mill.

Alternatively the crude phthalocyanine may be ground and the ground material mixed with the derivative prior to incorporation into the application medium.

The pigment product is a mixture of alpha and beta copper phthalocyanine and the selected derivative. It generally has a particle size of less than 0.1 micron. The surface area and the alpha-beta ratio of the product vary with the milling time, but generally the surface area, measured by BET analysis, is about 1–5 m$^2$/gm; the alpha crystal portion of the product is generally about 20 to 100 percent and preferably it is about 50 to 70 percent.

If desired, the pigment product may be given an acid wash; preferably, however, it is incorporated directly into an ink or paint system.

The products of this invention are suitable for use in a variety of ink and paint systems, such as for example offset inks, packaging inks, alkyd paints, and acrylic paints; they are particularly useful for publication gravure inks, especially those based on toluene. In general the strength of the products is more easily developed in the presence of aromatic solvents. At lower aromatic contents higher shear dispersion conditions and higher temperatures are beneficial for strength development.

Only the phthalimidomethyl phthalocyanine derivative or the sulfonated phthalimidomethyl phthalocyanine derivative is milled with the crude copper phthalocyanine to give a pigmentary product, no salt, solvent, or other grinding aid being used in the conditioning process.

By the simple method of this invention, crude copper phthalocyanine is conditioned into a pigment product that requires no additional processing before being used in, for example, a printing ink, paint, coating composition, or the like.

In another preferred embodiment of this invention the crude phthalocyanine is ground in the absence of any milling or grinding aid and then blended with the phthalocyanine derivative.

The compositions of this invention are superior to similarly prepared copper phthalocyanine without the derivatives in that they exhibit greater strength, improved rheology, improved gloss, and improved rate of dispersion in the application medium. Surprisingly, the products of this invention, in addition to providing economic advantages in processing, offer improvements in strength over blends of higher surface area (50–80 m$^2$/gm.) alpha or beta phthalocyanines and the same derivatives.

The invention will be further described in the following examples. Unless otherwise indicated, all parts are by weight.

EXAMPLE 1

A. (a) 94 Parts of a crude copper phthalocyanine that had been prepared from phthalic anhydride, urea, and copper salt by the solvent process and 6 parts of a copper phthalocyanine derivative prepared by the process of Example 1 of U.S. Pat. No. 2,855,403 were ground in a ball mill for 20 hours at 65° C. The product was a blue pigment having a BET surface area of about 1.5 m$^2$/gm., and an alpha content of 57 percent as determined by X-ray diffraction pattern.

(b) For purposes of comparison, 100 parts of the crude copper phthalocyanine was ground in a ball mill for 20 hours at 65° C. with no other ingredient or grinding aid. The product had an alpha content of 55 percent as determined by X-ray diffraction pattern.

(c) 94 Parts of crude copper phthalocyanine was ground in a ball mill for 20 hours at 65° C. and then dry blended with 6 parts of the phthalimidomethyl phthalocyanine derivative of part (a).

B. Each of the products of parts (a), (b), and (c) was dispersed into a publication gravure ink. The resulting inks had these properties:

TABLE I

| Example | Tinctorial Strength | Purity of Hue | Gloss |
|---|---|---|---|
| (b) | control | control | control |
| (a) | 20% strong | more intense | much glossier |
| (c) | 5% strong | slightly intense | close |

From the above it is clear that inks made from the pigment compositions of this invention (a) and (c) are superior in tinctorial strength, purity of hue, and gloss to the ink made with copper phthalocyanine ground without the specified derivative (b).

EXAMPLE 2

The procedure of Example 1(A) was repeated except that the crude copper phthalocyanine was milled with a sulfonated phthalimidomethyl phthalocyanine having the formula

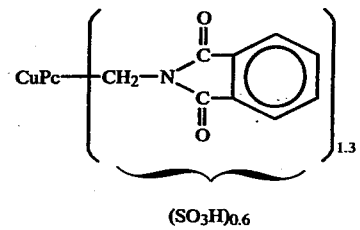

$(SO_3H)_{0.6}$

The product was a blue pigment composition having a BET surface area of about 1.6 m$^2$/gm. and an alpha content of 55 percent as determined by X-ray diffraction pattern.

EXAMPLES 3–8

The procedure of Example 1(A) (a) was repeated using the compositions and milling conditions shown in Table II.

TABLE II

| | Composition, % | | Milling Conditions | | Product | |
|---|---|---|---|---|---|---|
| Example | CuPc Crude | CuPc Derivative | Time, hours | Temperature °C. | Alpha, % | Surface Area, m$^2$/gm. |
| 3 | 94 | 6 | 10 | 68 | 54 | 1.4 |
| 4 | 94 | 6 | 16 | 68 | 58 | 1.5 |
| 5 | 90 | 10 | 20 | 50 | 60 | 1.4 |
| 6 | 88 | 12 | 20 | 50 | 60 | 1.4 |
| 7 | 97 | 3 | 20 | 50 | 56 | 1.5 |
| 8 | 94 | 6 | 20 | 100 | 52 | 1.3 |

These pigment products were dispersed into publication gravure inks. The properties of these inks were compared with those of ink (a) of Example 1(B) with the following results:

TABLE III

| Example | Coloristic Performance |
|---|---|
| 3 | 5% weak, gloss similar |
| 4 | similar |
| 5 | 3–5% weak, gloss similar |
| 6 | 5–7% weak, gloss similar |
| 7 | 10–12% weak, gloss lower |
| 8 | similar |

EXAMPLE 9

(A) 15 Parts of the product of Example 1(A)(a) was shot milled for 45 minutes with 50 parts of a maleic-modified rosin varnish.

(B) 47.8 Parts of the dispersion of part (A) was then let down into 100 parts of RS nitroceluulose varnish to give a packaging ink.

The procedure of parts (A) and (B) was repeated using the product of Example 1(A)(b) instead of the product of Example 1(A)(a). The initial dispersion had high viscosity and did not disperse satisfactorily. The ink was gritty, poor in gloss, and weak compared to the ink prepared from the pigment composition of this invention.

EXAMPLE 10

(A) 100 Parts of crude copper phthalocyanine was ground in a ball mill for 30 hours at 60° C. The product was a blue pigment having a BET surface area of 1.4 m$^2$/gm. and an alpha content of 62 percent as determined by X-ray.

(B) 85 Parts of the product of part (A) was intimately blended with 15 parts of the phthalocyanine derivative prepared by the process of Example 1 of U.S. Pat. No. 2,855,403.

(C) 5 Parts of the product of part (A) was ground on a shot mill with 50 parts of an acrylic thermosetting vehicle for 30 minutes. This material was reduced to an acrylic paint at 6 percent pigment with the same acrylic vehicle.

(D) The procedure of part (C) was repeated with the product of part (B).

Product (D) was much superior in rheology, cleaner, and brighter than product (C). In a standard $TiO_2$ reduction the product of part (B) showed greater strength than that of part (A).

On storage the comparative paint (C) showed a change to a greener shade and a noticeable loss in strength.

EXAMPLE 11

The procedure of Example 10 was repeated except that part (B) was replaced by a composition containing 85 parts of ground crude copper phthalocyanine and 15 parts of the sulfonated phthalimidomethyl phthalocyanine used in Example 2.

It was used in an acrylic paint, and the results were similar to those of Example 10(D).

EXAMPLE 12

For purposes of comparison 94 parts of crude copper phthalocyanine and 6 parts of the copper phthalocyanine derivative disclosed in U.S. Pat. No. 3,589,924 were mixed without milling or grinding either or both of the ingredients. The color of the mixture was so low that the product had no commercial value for use in printing inks, coating compositions, paints or the like.

What is claimed is:

1. A process for conditioning crude phthalocyanine pigment which consists of grinding the crude pigment with a phthalimidomethyl phthalocyanine derivative or a sulfonated phthalimidomethyl phthalocyanine derivative in the absence of any grinding aid.

2. A process for conditioning crude phthalocyanine pigment which consists of the steps of (1) grinding the crude pigment in the absence of any grinding aid and (2) blending the ground product of step (1) with a phthalimidomethyl phthalocyanine derivative or a sulfonated phthalimidomethyl phthalocyanine derivative.

3. The process of claim 1 or 2 wherein the grinding time is about 3 to 100 hours and the temperature is about 20° to 130° C.

4. The process of claim 1 or 2 wherein the grinding time is about 15 to 30 hours and the temperature is about 45° to 100° C.

5. A phthalocyanine pigment product prepared by the process of claim 1 or 2.

6. The product of claim 5 wherein the amount of the phthalimidomethyl phthalocyanine derivative or the sulfonated phthalimidomethyl phthalocyanine derivative is about 3 to 20 percent based on the weight of the product.

7. The product of claim 5 wherein the amount of the phthalimidomethyl phthalocyanine derivative or the sulfonated phthalimidomethyl phthalocyanine derivative is about 5 to 15 percent based on the weight of the product.

8. The product of claim 5 wherein the phthalocyanine is copper phthalocyanine.

* * * * *